UNITED STATES PATENT OFFICE.

EDWIN C. WALLACE, OF WEST ROXBURY, AND SAMUEL C. PRESCOTT, OF BROOKLINE, MASSACHUSETTS, ASSIGNORS TO THE BIO-CHEMIC FERTILIZER COMPANY, OF BOSTON, MASSACHUSETTS, A CORPORATION.

METHOD OF GARBAGE DISPOSAL.

1,260,103.      Specification of Letters Patent.      Patented Mar. 19, 1918.

No Drawing.      Application filed July 5, 1917. Serial No. 178,794.

*To all whom it may concern:*

Be it known that we, EDWIN C. WALLACE and SAMUEL C. PRESCOTT, citizens of the United States, residing, respectively, at West Roxbury, in the county of Suffolk and State of Massachusetts, and Brookline, in the county of Norfolk and State of Massachusetts, have invented certain new and useful Improvements in Methods of Garbage Disposal, of which the following is a specification.

The present invention relates to a method of garbage disposal involving fermentation, and has for its object to produce a method or system of disposal of garbage and similar materials, which will be sanitary, inoffensive and economical, and which will conserve the fertilizing value of the garbage itself, so that a product suitable for use as a fertilizer or as a fertilizer ingredient will be produced.

In large cities, the disposal of garbage is a serious problem, and many methods have been devised for the purpose, most of which are open to one or more serious objections, such as expense involved, wastefulness, or of being offensive and insanitary.

Garbage as collected, is a material which varies a great deal in composition, particularly as to its moisture content. The average of the solid material, after draining away free water or free liquid, if the same exists in the garbage to any considerable extent, may be considered as containing approximately 70% of water, and any method of disposing of garbage, in which this moisture content can be commercially utilized will accordingly be of economical interest. In many of the processes heretofore employed for disposing of garbage, the material had to be dried, which necessitated a considerable expenditure of heat for the removal of water. Methods of fermentation involving the use of aerobic bacteria necessitate the presence of a certain amount of moisture, and also an abundant supply of air to substantially the whole of the material under treatment. The amount of moisture however must not be too great, for if the moisture is present in amount sufficient to fill the pores or openings between the particles of the material, sufficient air for the proper growth and functioning of the aerobic bacteria cannot be supplied.

Briefly stated, our method consists in subjecting garbage to the action of bacteria, and particularly aerobic bacteria, under conditions which can be controlled and regulated as to temperature, moisture, air supply, reaction and proportions of bacterial food, together with the removal by adsorption, of such of the products of bacterial action as would be destructive to the bacterial life. The latter feature is of particular importance, and in our process such toxic products are adsorbed by a suitable filling and extending material as described below, and are neutralized or combined, whereby the accumulation of toxic products, in amounts sufficient to interfere with the proper growth and development of the bacteria is either entirely prevented, or the accumulation is so retarded that a large quantity of the garbage can be readily treated by fermentation, with a given amount of the extending material.

In carrying out our process, we prefer to first thoroughly commingle the garbage with material capable of adsorbing, neutralizing or destroying the toxic fermentative products, and such material may consist of finely ground dry mineral matter selected for the purpose, or a mixture of finely ground mineral matter with substantially non-putrescible organic matter, referred to hereinafter as the adsorbing material or filling and extending material. As examples of such mineral matter, we cite orthoclase or other potassium-containing rocks, phosphate rock, calcareous rock, gypsum and the like, as well as mixtures of these. The organic matter may include ground peat, woody tissue, sawdust and the like, to which sewage sludge may be added if available.

In operation a sufficient quantity of the adsorbing material should be employed to cover all of the particles of garbage with a dust-like substance and to leave an excess of the adsorbing material in the freshly made mixture, so that a sufficient amount of the dry adsorbing material will be present to take up the liquid set free by the breaking down or decomposition of the cellular tissue of the fermentable organic portion of the garbage. Owing to the variable character of the garbage, as to moisture content and general composition, the actual proportions, and to some extent the character of the adsorbing material used will vary between rather wide limits, ordinarily, however, considering ordinary household garbage with a moisture content of about 70%, about one part by volume of the adsorbing material as above specified, will suffice for from 2 to 3 volumes of the garbage, but with varying kinds of garbage, the variations will range all the way from equal volumes, up to one volume of adsorbing material to 5 volumes of garbage, the determining factor in all cases being the production of a semi-plastic, readily porous and substantially dry appearing mass, which mass should have sufficient coherence to form balls under pressure, which balls will gradually disintegrate when the pressure is released.

In order to secure an intimate mixing of the garbage and extending material, it is preferable to comminute the garbage and we have found it advantageous to add either all or a considerable portion of the adsorbing mineral matter, before the comminuting operation is performed, so that the mineral matter and garbage are simultaneously comminuted and thoroughly intermingled in one and the same operation.

After thoroughly intermingling and comminuting the garbage and adsorbing material, the mass is put into vats or other suitable containers, so arranged that control may be had of the temperature, moisture and air supply, and the mass is then allowed to ferment, either spontaneously or by the use of specially introduced cultures or "starters."

The fermentative action proceeds with increasing intensity for a period which varies from five to thirty days or more according to conditions and the character of the materials treated, and the character of the product desired.

Bacteriological examinations from time to time will show increasing numbers of saprogenic, cellulose splitting and acid forming bacteria, then follows a short period in which the numbers show practically no increase and this in turn is followed by a decrease in the number of bacteria found. A second charge of the garbage should then be added, using approximately 80% of the amount of garbage used in the original mixture: Additional charges are made when count of bacteria shows action is again slackening, but for the third charge we have found it advantageous to reduce the amount of garbage to approximately 65–70% of the amount used in the original mixture and for the fourth, fifth or subsequent charges to reduce the amount still further to approximately 50% of the volume of garbage used for the original charge.

In preparing the first or original charge for the containers, our preferred practice is, as above stated, to commingle the garbage with at least a portion of the adsorbing mineral (or mineral and organic extending material) before comminuting the garbage, but in making subsequent charges (in recharging) the result may be accomplished by alternative methods which may be used according to conditions, thus the mass may be removed from the containers, raw garbage added and then put through the comminuting and mixing process as in the first instance, or alternately the garbage may be comminuted, added to and thoroughly commingled with the mass in the container. As to which of these is to be used will depend upon the composition of the garbage and other factors.

In the second method the garbage may be comminuted with or without the addition of a small proportion of the adsorbing mineral, in the former case, it is obvious there may be a small portion of fresh adsorbing mineral added at each recharging with the garbage and as this may be considered as increasing the volume of the adsorbing mineral used in the first charge the amount of garbage added may be increased proportionately.

After each addition of garbage there is an interval varying from 24 to 72 hours before renewed activity is apparent but once this activity is in evidence it continues with increasing intensity, bacterial growth being stronger and generally of longer duration than after the previous charges and giving evidence in every way of stronger and more vigorous action.

When the addition of garbage fails to stimulate bacterial growth to such an extent that, after the relatively quiescent period referred to, the intensity of the action is not appreciably augmented it is evident that the power of the adsorbing mineral to prevent the formation of products prejudicial to bacterial life is substantially exhausted, therefore the further addition of fermentable matter is contra-indicated, and fermentation is simply allowed to proceed until action practically ceases and the entire mass then removed from the containers and final disposition made of it, after drying, if so desired.

The process is then recommenced using a fresh supply of the adsorbing material.

It will be found that the material removed from the containers, after the completion of the process of fermentation, possesses considerable value as a fertilizer and may be used either alone or in connection with other forms of fertilizing material. The results of the interaction between the products of decomposition and the adsorbing mineral naturally varies with the nature of the mineral employed. Humus-like bodies are, however, always present and growing tests have shown that the fermented product always posseses greater fertilizing value than an equal amount of the same mineral matter applied direct to the soil without having been subjected to the action of fermenting organic matter.

It is also an excellent medium, either with or without some modification, for the propagation of special types of micro-organisms useful in agriculture. As examples of such micro-organisms, we call attention to the employment of such bacteria as *Bacterium radicicola* and *Azotobacter* or others.

By varying the time, the temperature and the kind of adsorbing mineral material, and by the introduction at the proper time of special cultures of micro-organisms the course of the chemical change may be controlled with the formation of special kinds of plant food.

To secure most rapid chemical change during fermentative action the temperature should be maintained with a reasonable degree of the optimum, viz. 100 degrees F. and the air supply must be sufficient to stimulate intense activity of the aerobic bacteria, with moisture just sufficient to maintain the semiplastic and porous condition described and the proportion of adsorbing mineral to the fermentable organic matter must be such that products which inhibit bacterial growth can not accumulate.

It has been found that by this method an (as yet) unidentified micro-organism has been developed which has much more powerful action upon cellulose than any type heretofore known to the art.

It will be obvious that sometimes it will be advisable to mix together several kinds of garbage, for example the garbage from one section of the city may be too wet, and that from another section may be too dry. By properly mixing the two together, a material of proper moisture content can be secured without adding water from the outside.

During any fermentation process there are formed in the mass considerable amounts of such materials as tend to restrict bacterial growth. By the adsorption process, such materials are removed from solution and rendered harmless. To a certain extent also the presence of the extending material will actually prevent the formation of such toxic bodies, and we do not limit ourselves to any particular theory in this regard.

We claim:

1. A method of garbage disposal which consists in mixing comminuted garbage with a relatively dry extending and bulking material in such proportions as to produce a mass of material containing air spaces unfilled with liquid throughout the mass thereof, thereafter subjecting such mixture to the action of bacteria under conditions which can be controlled and regulated as to temperature, moisture, air supply and proportions of bacterial food, so as to maintain the bacterial action and the fermentation processes at the maximum; and adding further amounts of garbage from time to time as the intensity of the action slackens.

2. A process of garbage disposal which comprises mixing garbage material with an amount of dry mineral matter capable of taking up all free liquid in the garbage, and grinding the mixture to produce a mixture of materials having unfilled air spaces and passages extending through the body of the same, thereafter subjecting the mixture to fermentation by aerobic bacteria under controllable conditions as to air and moisture supply so as to allow rapid fermentative action by aerobic bacteria, until the garbage matter has largely been fermented.

3. The herein described process of treating garbage, comprising first mixing garbage with a substantially dry filling material in such proportions as to leave a porous mass readily permeable to air and comminuting the material, to leave the said mass open at all points to access of air, allowing fermentation to take place within such mass, until the major part of the said garbage has been decomposed, and until the bacterial activity decreases, commingling a further amount of garbage with such product, grinding such mixture and again allowing to ferment, and repeating the steps of adding garbage and fermenting as often as desired.

4. The process which comprises producing an intimate mixture of comminuted garbage and comminuted substantially dry filling and extending material, in such proportions as to leave communicating air spaces unfilled with liquid throughout the body of the mixture, whereby the air necessary for fermentation by aerobic bacteria can freely permeate the mass, allowing fermentation to take place within such mass, until the major part of the said garbage has been decomposed, and until the bacterial activity decreases, commingling a further amount of garbage with such product, the amount of garbage so added being in less proportion than that initially employed, again thoroughly mixing, allowing to ferment, and repeating the addition of garbage, mixing and fermentation as often as desired.

In testimony whereof we affix our signatures in presence of two witnesses.

EDWIN C. WALLACE.
SAMUEL C. PRESCOTT.

Witnesses:
JOHN DEARBORN,
WILLIAM F. HAVUTY.